United States Patent
Chang

(10) Patent No.: US 6,704,341 B1
(45) Date of Patent: *Mar. 9, 2004

(54) DIODE-PUMPED LASER WITH IMPROVED PUMPING SYSTEM

(75) Inventor: Jim J. Chang, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 09/657,394

(22) Filed: Sep. 8, 2000

Related U.S. Application Data
(60) Provisional application No. 60/166,464, filed on Nov. 19, 1999.

(51) Int. Cl.$^7$ .............................................. H01S 3/091
(52) U.S. Cl. .............................. 372/70; 372/72; 372/75
(58) Field of Search ............................. 372/72, 75, 70, 372/35, 92, 103

(56) References Cited

U.S. PATENT DOCUMENTS

| | | | | |
|---|---|---|---|---|
| 3,668,546 A | * | 6/1972 | Schumacher | 372/35 |
| 4,240,692 A | * | 12/1980 | Winston | 385/146 |
| 4,924,474 A | | 5/1990 | Yagi et al. | 372/75 |
| 5,033,058 A | | 7/1991 | Cabaret et al. | 372/75 |
| 5,307,365 A | * | 4/1994 | Stappaerts et al. | 372/72 |
| 5,636,239 A | * | 6/1997 | Bruesselbach et al. | 372/70 |
| 5,774,488 A | * | 6/1998 | Kmetec | 707/5 |
| 5,778,020 A | * | 7/1998 | Gokay | 372/75 |
| 5,978,407 A | | 11/1999 | Chang et al. | 372/75 |
| 6,186,649 B1 | * | 2/2001 | Zou et al. | 362/347 |
| 6,407,535 B1 | * | 6/2002 | Friedman et al. | 322/2 R |
| 2002/0105997 A1 | * | 8/2002 | Zhang | 372/70 |

FOREIGN PATENT DOCUMENTS

WO    WO 98/44604    * 10/1998    ........... H01S/3/091

OTHER PUBLICATIONS

Pantelic et al., "solid–state Laser pumping with a planar compound parabolic concentrator", Applied Optics, vol. 36, No. 30, Oct. 1997, pp. 7730–7740.*

Sun Kook Kim et al., "Design of the Optimized V–shaped Duct for the Diode Array Pumped Nd;YAG Laser System", IEEE, Conference, Lasers and Electro–Optics, 1999, CLEO/Pacific Rim '99Applied Optics, pp 479–480.*

* cited by examiner

Primary Examiner—Tom Thomas
Assistant Examiner—José R Diaz
(74) Attorney, Agent, or Firm—Eddie E. Scott; Alan H. Thompson

(57) ABSTRACT

A laser wherein pump radiation from laser diodes is delivered to a pump chamber and into the lasing medium by quasi-three-dimensional compound parabolic concentrator light channels. The light channels have reflective side walls with a curved surface and reflective end walls with a curved surface. A flow tube between the lasing medium and the light channel has a roughened surface.

2 Claims, 6 Drawing Sheets

DIODE-PUMPED LASER WITH IMPROVED PUMPING SYSTEM

CROSS-REFERENCE TO RELATED APPLICATIONS

This application claims the benefit of U. S. Provisional Patent Application Ser. No. 60/166,464, to Jim J. Chang, titled "Diode-Pumped Laser Apparatus with Improved Pumping Design," filed Nov. 19, 1999," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to a lasers, and more particularly to a diodepumped laser with an improved pumping system.

2. State of Technology

Solid-state lasers pumped by high-power laser diodes have been used in a wide range of applications. Conventional diode-pumped solid state lasers can be classified as end-pumped and side-pumped lasers.

An example of a side-pumped laser is described in U.S. Pat. No. 5,978,407 to Jim J. Chang, et al, issued Nov. 2, 1999. This patent describes a compact, side-pumped laser pump cavity that uses non-conventional optics for injection of laser-diode light into a laser pump chamber. The laser pump cavity includes a plurality of elongated light concentration channels. The light concentration channels are compound parabolic concentrators (CPC) which have very small exit apertures so that light will not escape from the pumping chamber and will be multiply reflected through the laser rod.

In U.S. Pat. No. 4,924,474 to Shigenoria Yagi, et al, issued May 8, 1990, a laser device with high oscillation efficiency is shown. The laser device comprises a laser medium, a semiconductor light-emitting element for exciting the laser medium, a reflecting surface surrounding the outer periphery of the laser medium along its optical axis, and an opening provided in a part of the reflecting surface for causing light from the semiconductor light-emitting element to be incident upon the laser medium. The laser device is improved further by providing a polarizing plate and a light guide between the light-emitting element and the laser medium and by deviating the optical axis of excitation light from the central axis of the laser medium. The system described in the patent uses diode light sources which are discrete in the longitudinal direction and makes no provision to concentrate the light from these diodes. The discrete characteristic imposes nonuniformities in the deposition of the pump light decreasing the beam quality of the output laser beam and the lack of optical concentrators limits the number of diode sources which can excite the lasing medium thereby limiting the output power of the device. Another feature of the system described in the patent is that the lasing rod is cemented to a heat radiator which also serves as the reflector for the pump cavity. Although this is a convenient way to couple light into the lasing media, the heat removal capabilities are not great and this device would not scale to high average powers.

In an attempt to circumvent the problem of pump light re-entering the diode cavity through the opening in the pump cavity, an "optical diode" is provided. The problem with light re-entering the diode structure is that the subsequent diode heating shifts the wavelength of the diode light out of the absorption bands of the laser medium. This optical diode consists of a polarizing and quarter wave plate placed between the diode and the pump cavity and leads to higher cost and lower efficiency.

In U.S. Pat. No. 5,033,058 to Louis Cabaret, et al, issued Jul.16, 1991, a rod laser with optical pumping from a source having a narrow emitting area is shown. Pumping laser diodes are disposed around a reflector tube having narrow windows through which the emitting areas of the diodes look. The tube leaves an angular gap around a rod to be pumped and a cooling liquid flows in said gap. In this device the discrete nature of the diodes in the longitudinal direction has been eliminated in favor of a line source of diodes but again there is no optical concentrator. The lack of an optical concentrator limits the number of diodes which can surround the laser rod thereby the scaling to high average power. Since there is no optical concentrator which can also increase the angular distribution of the diode light, the absorption of the diode light in the laser rod will be nonuniform causing poor beam quality at high average power.

A problem plaguing both end-pump and side-pump configurations is that of inhomogeneous pumping. The side-pump laser has to balance De Beer's law absorption that tends to deposit the power closer to the surface closest to the emitter against the loss of absorption efficiency encountered when a lightly doped rod is used to permit deeper penetration.

In addition, diode light concentration using conventional optics such as cylindrical lenses often limits the number of emitters that can be circled around the rod. The end-pump laser using an imaging device to demagnify the emitting diode array results in imprints of the diode array image at the end of the rod. Guiding inside curved surfaces of the rod, leads to a repeating sequence of these images. Inevitably, both geometries end up with hot and cold spots. This limits the average output attainable because of wavefront distortion and depolarization.

To resolve these issues, a side-pumped scheme with a novel pump cavity configuration that can improve laser performance has been developed as described in and claimed in this patent application. An advance in laser technology will be provided by a system that enables more uniform laser pumping in both the transverse and longitudinal axes and highly effective recycle of pump radiation, leading to improved laser performance. It will also be an advance in laser technology to provide a system that effectively widens the acceptable radiation wavelength of the diodes, resulting in a more reliable laser performance with lower cost.

SUMMARY OF THE INVENTION

In accordance with the present invention, a laser pumping system is provided with a goal of improving the efficiency and reducing the cost of diodepumped solid-state lasers.

U.S. Pat. No. 5,978,407 to Jim J. Chang, et al, issued Nov. 2, 1999, incorporated herein by reference, describes a compact, side-pumped laser pump cavity that uses non-conventional optics for injection of laser-diode light into a laser pump chamber. The laser pump cavity includes a plurality of elongated light concentration channels. The light concentration channels are compound parabolic concentrators (CPC) which have very small exit apertures so that light will not escape from the pumping chamber and will be multiply reflected through the laser rod. This patent emphasizes the need for improvement in injection of laser-diode light into a laser pump chamber.

The present invention provides a laser having an elongated lasing medium within an elongated pumping chamber. The laser contains at least one diode for producing diode radiation and at least one compound parabolic concentrator light channel for transporting the diode radiation into the pump chamber and into the lasing medium. The compound parabolic concentrator light channels have reflective side walls and reflective end walls. In the preferred embodiment the reflective end walls have curved surfaces. A flow tube with light diffusion properties is located between said lasing medium and said at least one light channel.

In the preferred embodiment of the present invention, quasi-three-dimensional CPC light channels are employed to side-pump a laser rod enclosed in a laser pump chamber. In the previous Chang patent, the CPC was effective in channeling the pump light in the dimension transverse to the laser rod axis but did little to channel the pump light along the rod axis. In the invention described and claimed in this patent application, the pump radiation from the laser diodes is delivered to the pump chamber by the light channels. The pump radiation that enters the pump chamber is then distributed by the pump chamber to achieve uniform pumping of a laser rod in both the transverse and longitudinal directions. The surfaces of the pump chamber are constructed by either surface or volume diffusers. The design of the pump chamber enables efficient trapping the pump light once it enters the cavity. This leads to efficient recycling of unused pump radiation for improved laser performance. This improved pump system is expected to result in a more cost-effective diode-pump laser system.

Additional aspects, advantages, and features of the invention are set forth in part in the following description. Various aspects, advantages, and features of the invention will become apparent to those skilled in the art upon examination of the description and by practice of the invention.

DETAILED DESCRIPTION OF THE INVENTION

Figure 1:
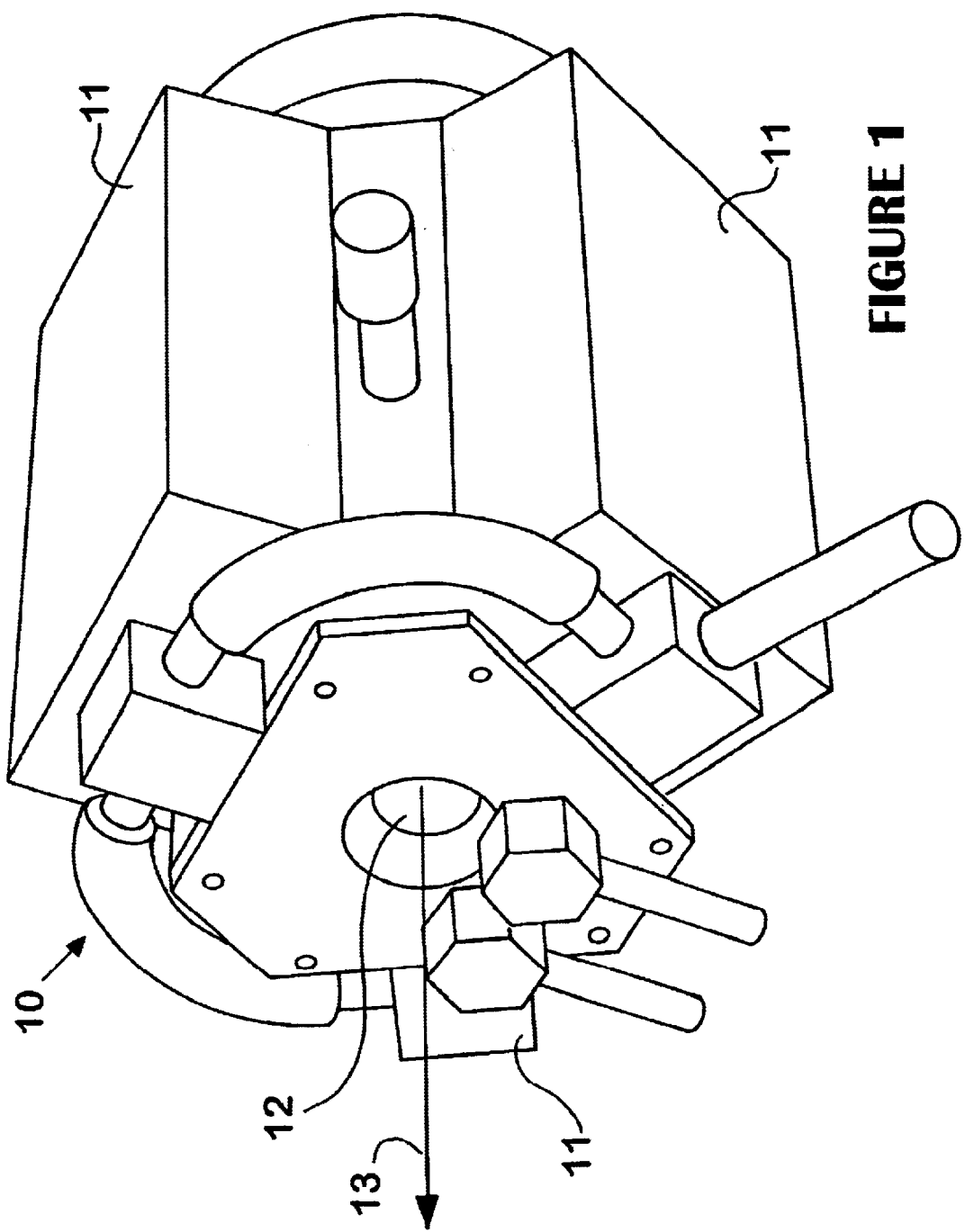
FIG. 1 is an illustration of a laser system constructed in accordance with the present invention.

Referring now to the drawings and in particular to FIG. 1, an illustration of an embodiment of a laser system 10 constructed in accordance with the present invention is shown. The laser system 10 includes a pumping system that will improve the efficiency and reduce the cost of diode-pumped solid-state lasers. The laser diodes are contained within diode housings 11. This pumping system employs quasi-three-dimensional CPC light channels to side-pump a laser rod enclosed in a laser pump chamber 12. The pump radiation from laser diodes is delivered to the pump chamber 12 by the light channels. The laser light out put 13 is projected from the pump chamber 12. Uses of the laser system 10 include laser machining, laser displays, power beaming, laser guide stars, and other laser uses.

The pump radiation that enters the pump chamber 12 is then distributed by the pump chamber 12 to achieve uniform pumping of a laser rod. The surfaces of the pump chamber are constructed by either surface or volume diffusers. The design of the pump chamber 12 enables efficient trapping the pump light once it enters the cavity. This leads to efficient recycling of unused pump radiation for improved laser performance. As a result, this improved pump system results in a more cost-effective diode-pump laser system.

The lasing medium is a cylindrical laser medium, which can be a solidstate laser rod, a liquid dye, or a gas laser. The preferred embodiment of the present invention utilizes a laser system that is a diode pumped solid state system using Nd:YAG rods as the lasing media. The laser is a diode pumped Nd:YAG rod which can be operated in various modes including the fundamental CW IR or pulsed green modes. The laser uses a Compound Parabolic Concentrator (CPC) to direct the diode light to the laser rod in a compact, efficient manner. The CPC allows many passes of the diode light through the laser rod thereby reducing the sensitivity of the diode wavelength to the efficiency of the laser. This property also decreases the sensitivity of the diode thermal management system and improves efficiency.

Figure 2:
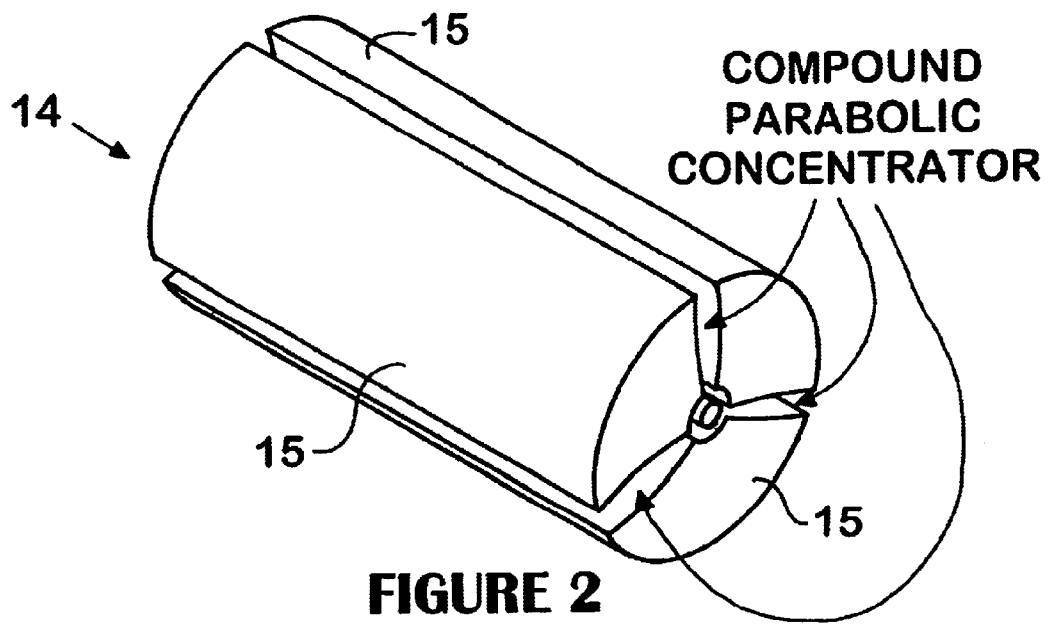
FIG. 2 is a perspective, elongated view of a pump radiation coupling structure.

Referring now to FIG. 2, a perspective, elongated view of a pump radiation coupling structure 14 of a laser system constructed in accordance with the present invention are shown. The laser pumping structure 14 is in the form of a circular cylinder comprising three segments 15. Each segment 15 includes a curved outer surface which forms part of the outer surface of the circular cylinder.

Figure 3:
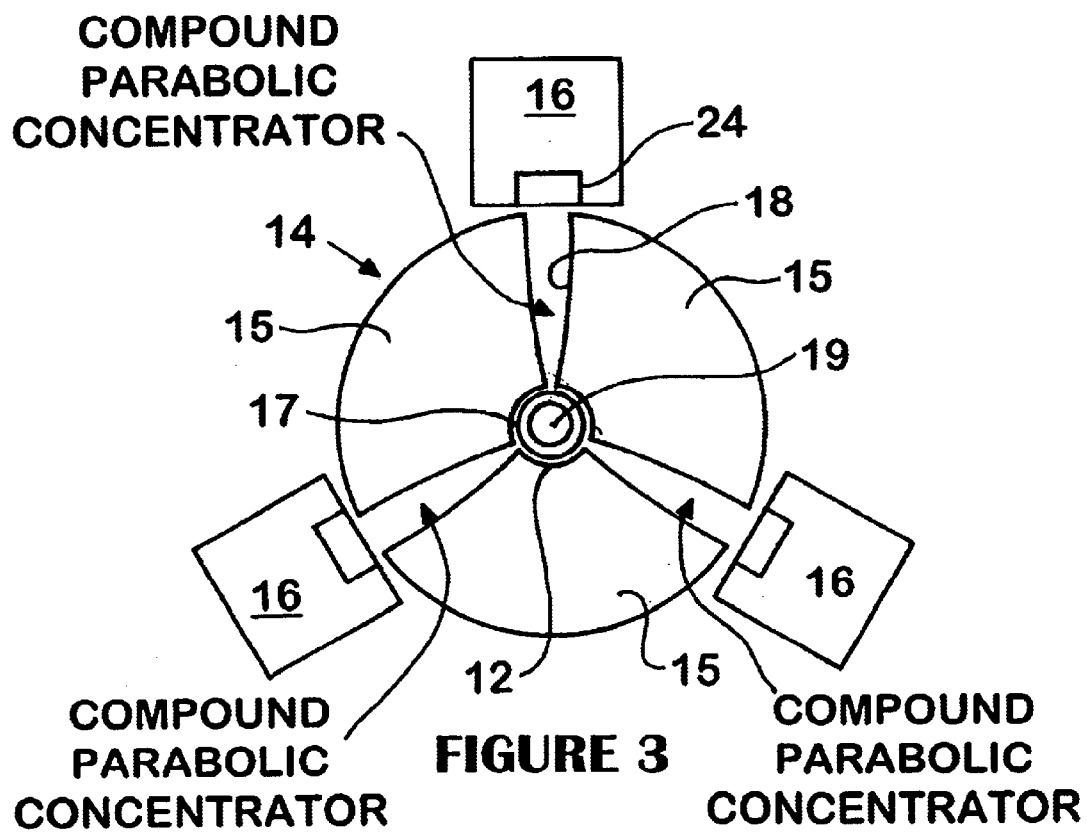
FIG. 3 is a cross-sectional view of the coupling structure.

A cross-sectional view of the coupling structure 14 of the laser system is shown in FIG. 3. Three diode modules 16 containing 24 diode bars each are focused onto a cylindrical YAG pump chamber 12 using the focussing properties of a Compound Parabolic Concentrator (CPC). The CPC efficiently.transfers the widely divergent diode light to the pump chamber through a series of shallow angle reflections. The shallow angles ensure a low reflection loss and result in high transfer efficiency, i.e. >90%. The reflective surface 18 of the circular cylinder segments 15 and the diffuse reflection coating improve the transfer of diode light to the laser rod 19. Light from the exit of the CPC passes through the YAG rod with a possibility of many passes since the output area of the CPC is a small fraction of the YAG pump surface area. A flow tube 17 tube with light diffusion properties diffuses the pump radiation before it enters the laser rod. In the prior art, the highly directional pump radiation during the first path in the pump chamber (i.e. before hitting the wall of the pump chamber) can lead to non-uniform pumping of the laser rod 19. The present invention endeavors to resolve this problem by using the flow tube 17, as shown in FIG. 3, with light diffusion properties, which tends to diffuse the pump radiation before it enters the laser rod 19. The flow tube could have roughened outer surface or it could be contain light diffusing properties.

Figure 4:
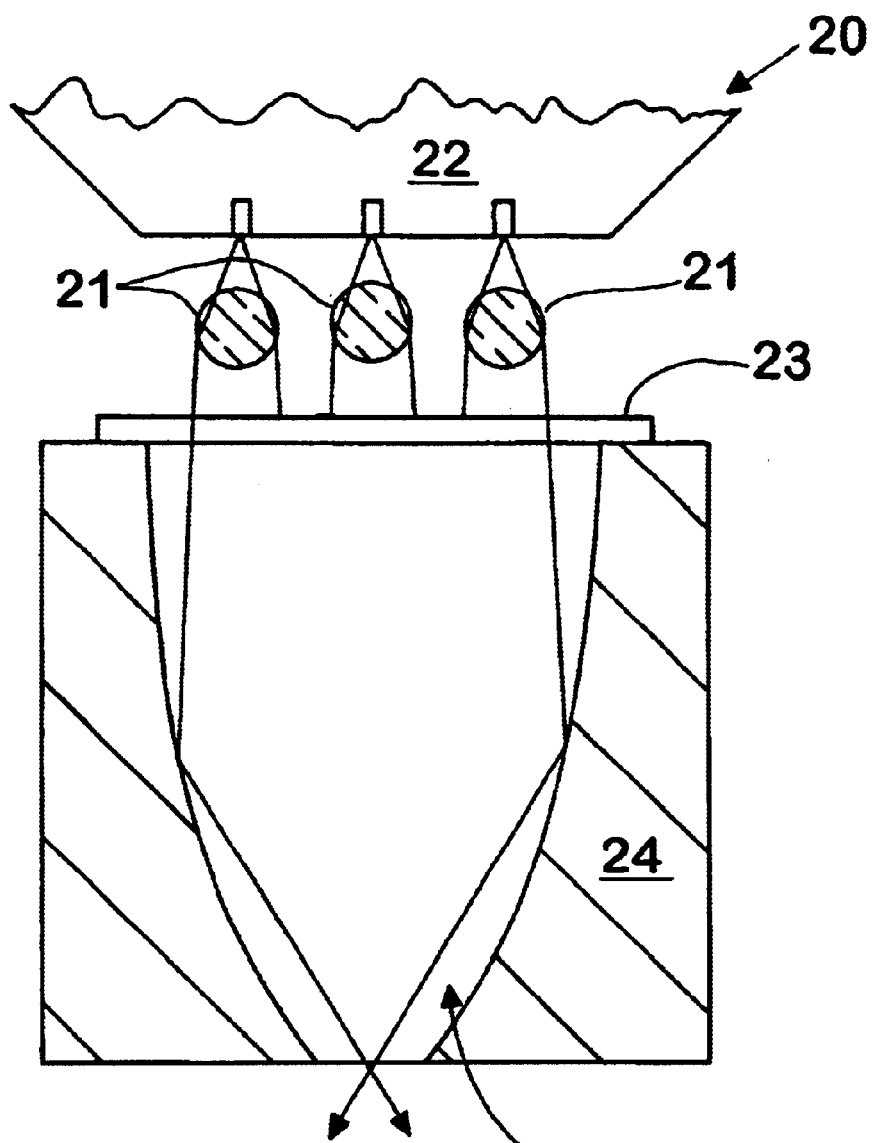
FIG. 4 is an enlarged view of a diode module of a CPC.

Referring now to FIG. 4 an enlarged view of a diode module 20 of a CPC is shown. The laser diodes 22 and the cylindrical lenses 21 transfer diode light through window 23 to the pump chamber through a series of shallow angle reflections. The CPC 24 efficiently transfers the widely divergent diode light to the pump chamber.

Each pumping light concentration channel has an input aperture and an exit aperture. The laser diodes in the diode module are oriented to output radiation into the input aperture of an associated pumping light concentration channel and are disposed along the full length of each light concentration channel.

U.S. Pat. No. 5,978,407 to Jim J. Chang et al, issued Nov. 2, 1999, previously discussed, shows a rod laser that is side pumped by light concentration channels using Compound Parabolic Concentrators (CPC) which allow many laser diodes to be packed around the rod, reduce the output apertures to limit the back flux of pump light into the diodes and widen the acceptable radiation wavelength of the diodes. In this patent, however, no effort was made to correct the diode radiation pattern in the longitudinal direction, i.e. parallel to the rod axis, which results in a loss of efficiency for laser rods of finite length.

Figure 5:
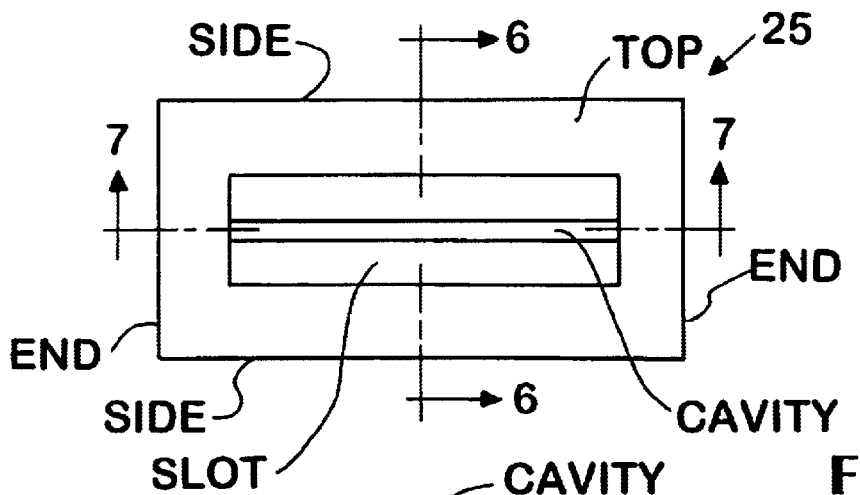
FIG. 5 is a top view of the light channel opening a 2-D CPC light channel for side-pumping a laser rod.
Figure 6:
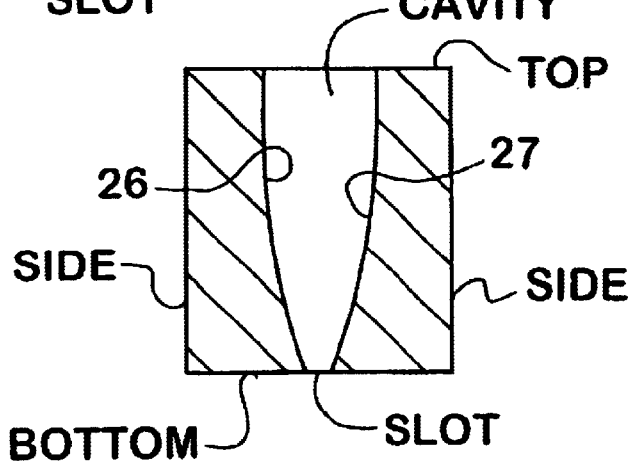
FIG. 6 is a section taken along lines AA of FIG. 5.
Figure 7:
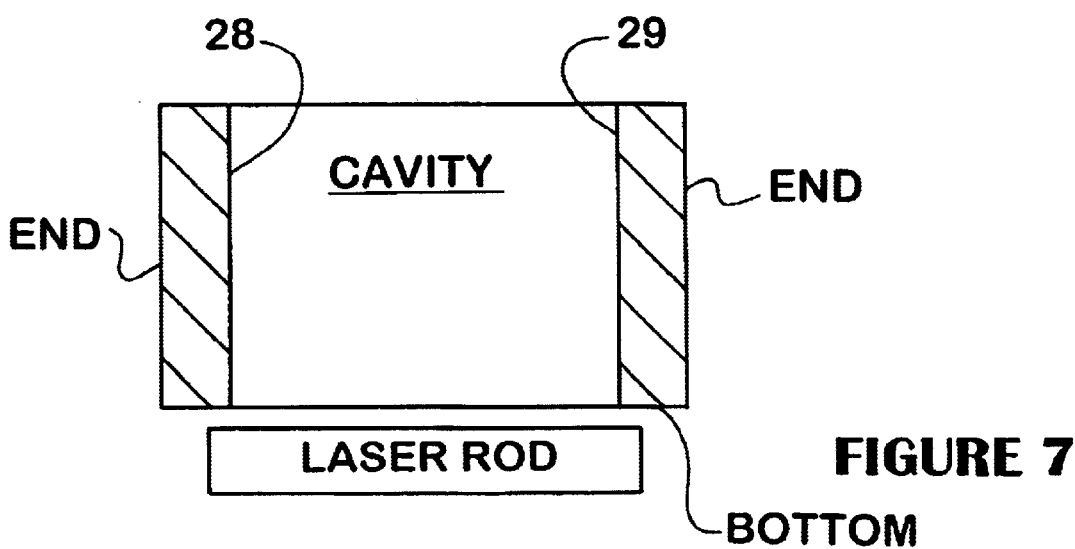
FIG. 7 is a section taken along lines BB of FIG. 5.

Referring now to FIGS. 5, 6, and 7, a top view of the light channel opening a 2-D CPC light channel 25 for side-pumping a laser rod is shown. Two dimensional (2-D) compound.parabolic concentrators (CPCs) can be used to channel the pump radiation into a small pump chamber through narrow slots. The CPC output slot width b, in the 2-dimensional analysis has a theoretical minimum expressed as $b = a \sin \vartheta / n$, Where n is the refractive index of the medium in the volume of the CPC (i.e., n=1 for air and n=1.3 for water, 1.5 for glass), a is the width of the CPC input opening, and υ is the beam divergence of the laser-diode radiation that enters the CPC. The surfaces of a CPC have high reflectivity coating to minimize its transmission loss.

As shown in FIG. 6, the 2-D CPC light channel has left and right tapering side surfaces 26 and 27 which form the sides of an elongated pumping light concentration channels. As shown in FIG. 7 the light channel has first and second flat end surfaces 28 and 29 which are flat surfaces.

Figure 8:
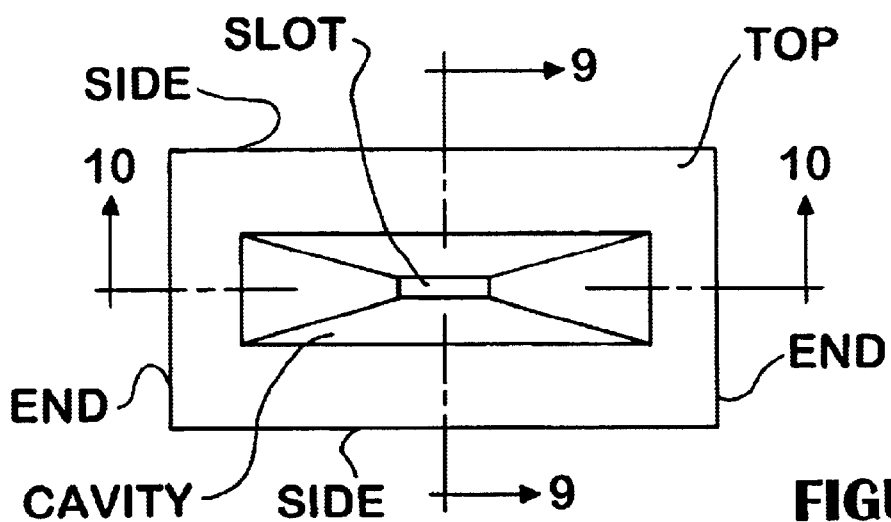
FIG. 8 is a top view of the light channel opening a quasi 3-D CPC light channel for side-pumping a laser rod.
Figure 9:
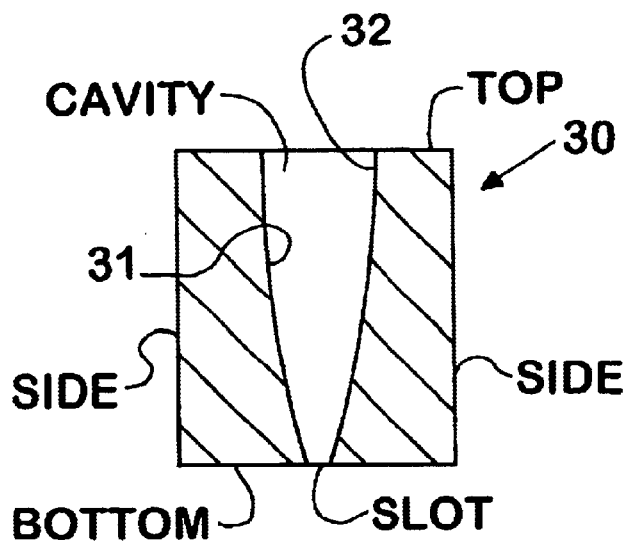
FIG. 9 is a section taken along lines AA of FIG. 8.
Figure 10:
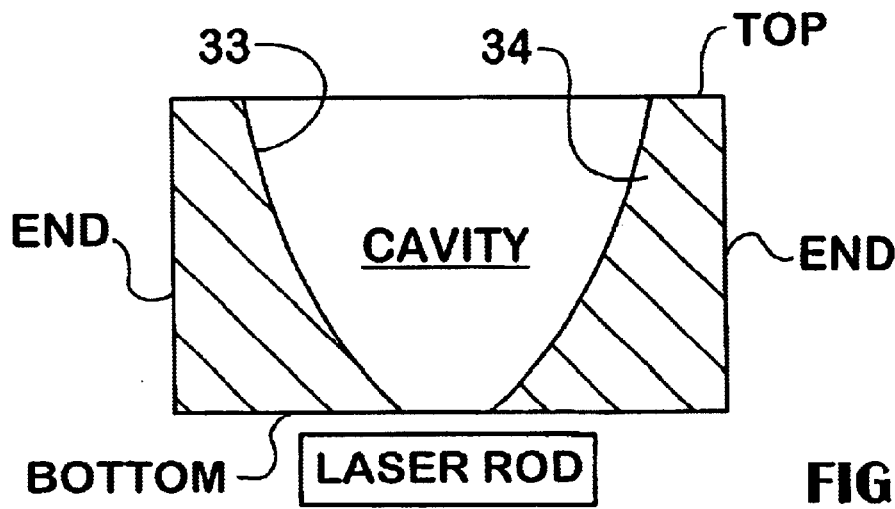
FIG. 10 is a section taken along lines BB of FIG. 8.

Referring now to FIGS. 8, 9, and 10, this side-pump configuration is further improved by optimizing the designs of the CPC light channels and diffusers of the pump chamber as will be described. The 2-D CPC has been improved to quasi-3D CPC to optimize the compression of the pump radiation into the pump chamber. The present invention utilizes improved Compound Parabolic Concentrators (CPC). A laser rod is located inside the pump chamber to receive the pump radiation. The slots on the pump chamber need to be small to prevent much pump radiation from escaping once it enters the chamber.

As shown in FIG. 9, the quasi 3-D CPC light channel 30 has left and right tapering side surfaces 31 and 32 which form the sides of an elongated pumping light concentration channels. As shown in FIG. 10 the light channel has first and second tapered end surfaces 33 and 34. This enables the system to reduce the volume of both the pump chamber and laser rod while maintaining the same amount of pump radiation that is channeled into the pump chamber. This not only lowers the lasing threshold, but also increases the density of the pump radiation in the chamber. Theoretical estimation indicates that about three-fold increase of pump density in the pump chamber when a quasi-3D CPC is used to replace a 2-D CPC. The increased pump density also allows the pumping of quasi-three-level laser systems (Yb, Ho, and Tm), which have a relatively high lasing threshold. The four surfaces of the quasi-3D CPC are formed by shaping metal blocks and are highly reflective.

Figure 11:
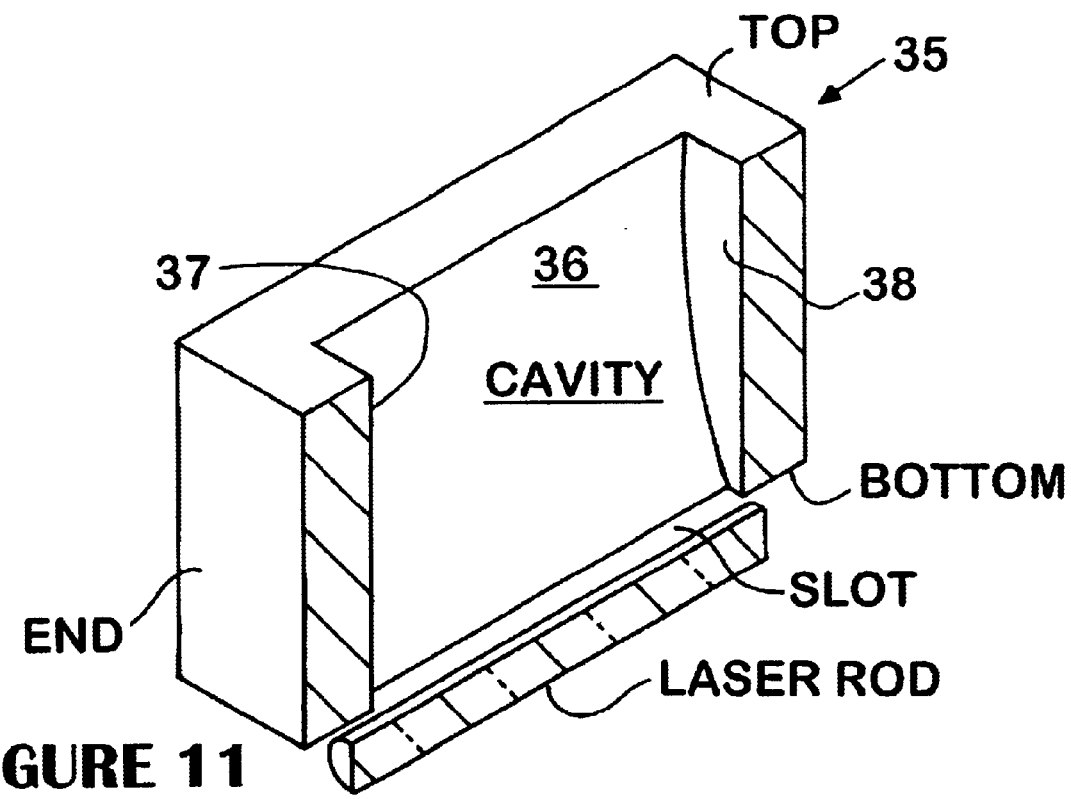
FIG. 11 is a perspective view of the light channel structure shown in FIG.

An illustration of a light channel structure 35 is shown in FIG. 11. A compound parabolic concentrator (CPC) is used to channel pump radiation into a pump chamber through a narrow slot. The light channel 35 has tapering side surfaces which form the sides of an elongated pumping light concentration channels. One of the tapering side surfaces 36 is shown in FIG. 11. The light channel 35 also has first and second flat end surfaces 37 and 38. The flat surfaces are highly reflective.

Figure 12:
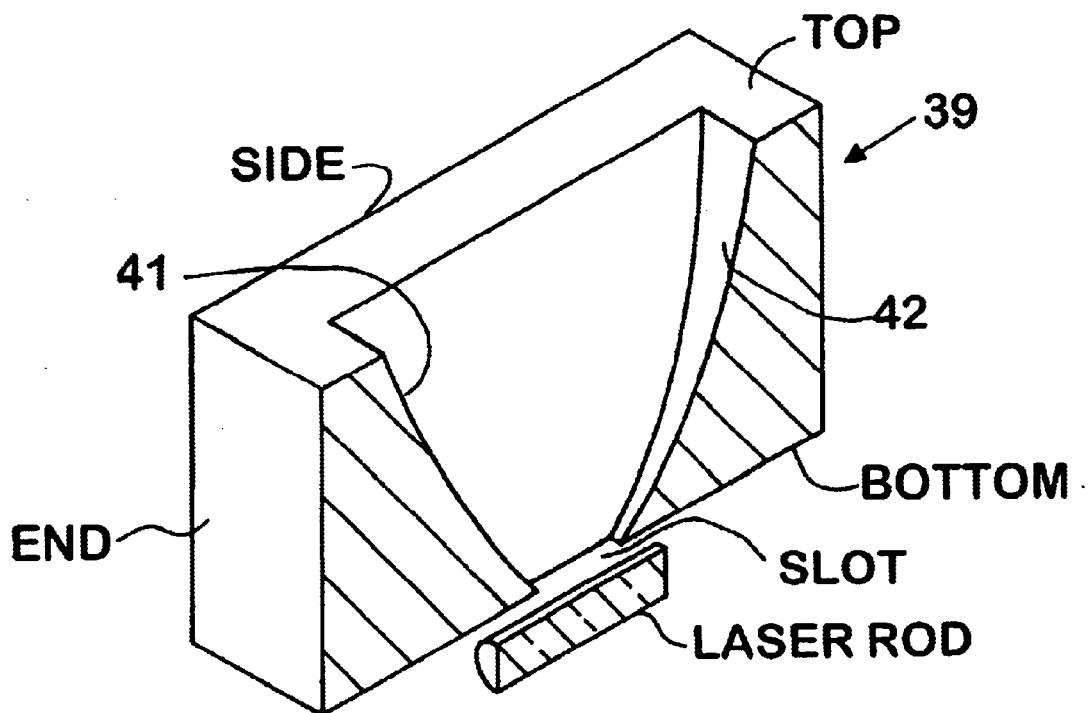
FIG. 12 is a perspective view of the quasi 3-D light channel structure shown in FIG. 10.

Referring now to FIG. 12 a perspective view of a quasi 3-D light channel structure 39 is shown. The quasi 3-D CPC light channel 39 has tapering side surfaces which form the sides of an elongated pumping light concentration channel. One of the tapering side surfaces 40 is shown in FIG. 12. The light channel 39 also has first and second tapered end surfaces 41 and 42. The four surfaces of the quasi-3D CPC are formed by shaping metal blocks and are highly reflective. This enables the system to reduce the volume of both the pump chamber and laser rod while maintaining the same amount of pump radiation that is channeled into the pump chamber. This not only lowers the lasing threshold, but also increases the density of the pump radiation in the chamber. Theoretical estimation indicates that about three-fold increase of pump density in the pump chamber when a quasi-3D CPC is used to replace a 2-D CPC. The increased pump density also allows the pumping of quasi-three-level laser systems (Yb, Ho, and Tm), which have a relatively high lasing threshold.

The invention has now been described with reference to the preferred embodiments. Alternatives and substitutions will now be apparent to persons of skill in the art. The light concentration channels and pump chamber may be filled with water or higher index fluid for the reduction of pump-beam divergence. The side-pumped configuration will yield increased efficiency compared to prior art configurations. Accordingly, it is not intended to limit the invention except as provided by the appended claims.

What is claimed is:

1. In a laser having an elongated lasing medium within an elongated pumping chamber, an improved pumping system comprising:

a multiplicity of diodes for producing diode radiation, and a multiplicity of compound parabolic concentrator light channels for transporting said diode radiation from said diodes into said pump chamber and into said lasing medium, said compound parabolic concentrator light channels having reflective side walls with a curved surface and said compound parabolic concentrator light channels having reflective end walls, and wherein said reflective end walls are curved surfaces.

2. In a laser having an elongated lasing medium within an elongated pumping chamber, an improved pumping system comprising:

a multiplicity of diodes for producing diode radiation, and a multiplicity of compound parabolic concentrator light channels for transporting said diode radiation from said diodes into said pump chamber and into said lasing medium, said compound parabolic concentrator light channels having reflective side walls with a curved surface and said compound parabolic concentrator light channels having reflective end walls, and wherein said curved surfaces of said reflective end walls are parabolic curved surfaces.

* * * * *